May 1, 1951 — G. I. E. HANSEN — 2,551,374
COMBINATION PROTECTING SHIPPING PAD AND ATTACHING CLIP
Filed Oct. 11, 1948 — 2 Sheets-Sheet 2
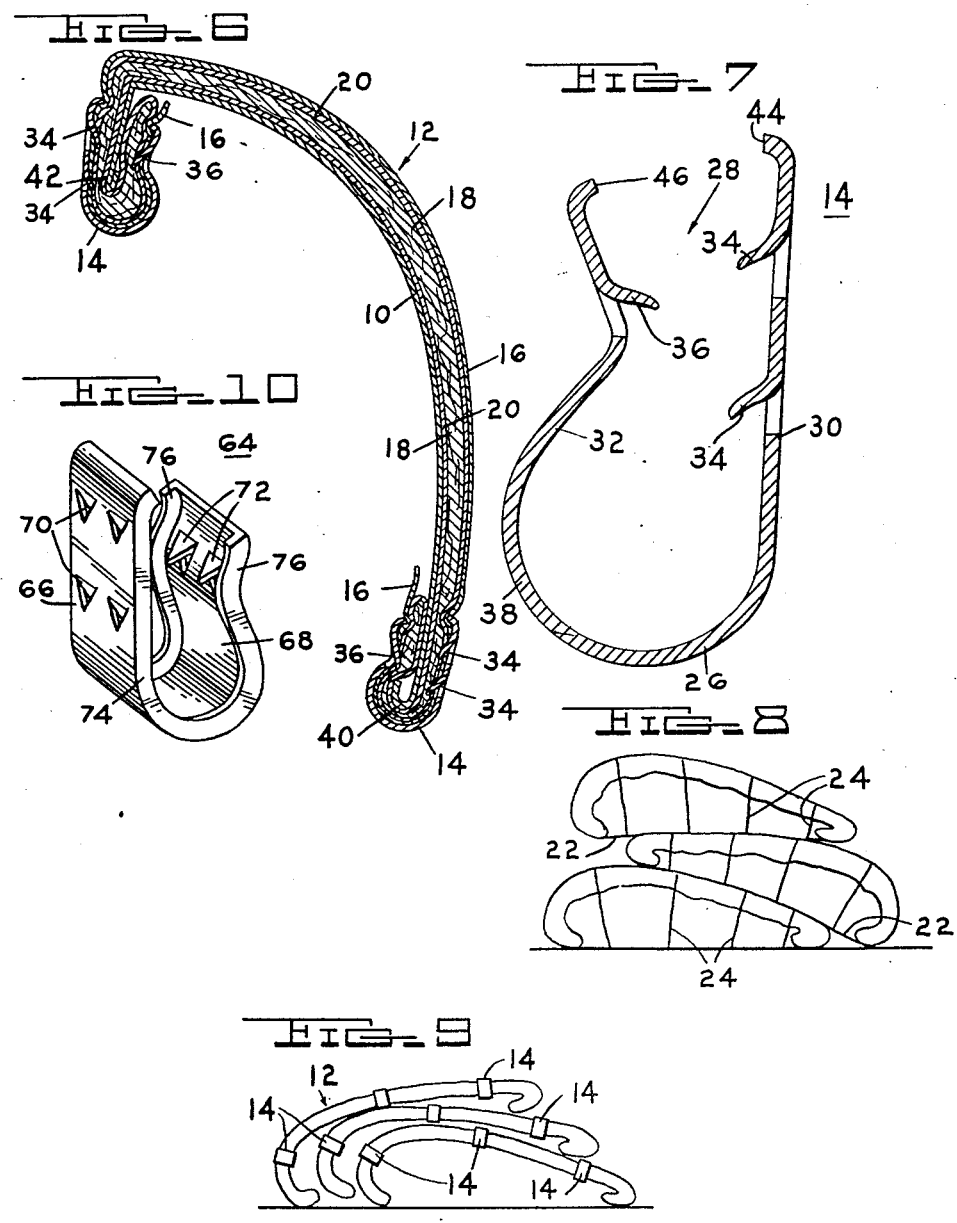
INVENTOR.
GEORGE I. E. HANSEN
BY Burton & Parker
ATTORNEYS Patented May 1, 1951

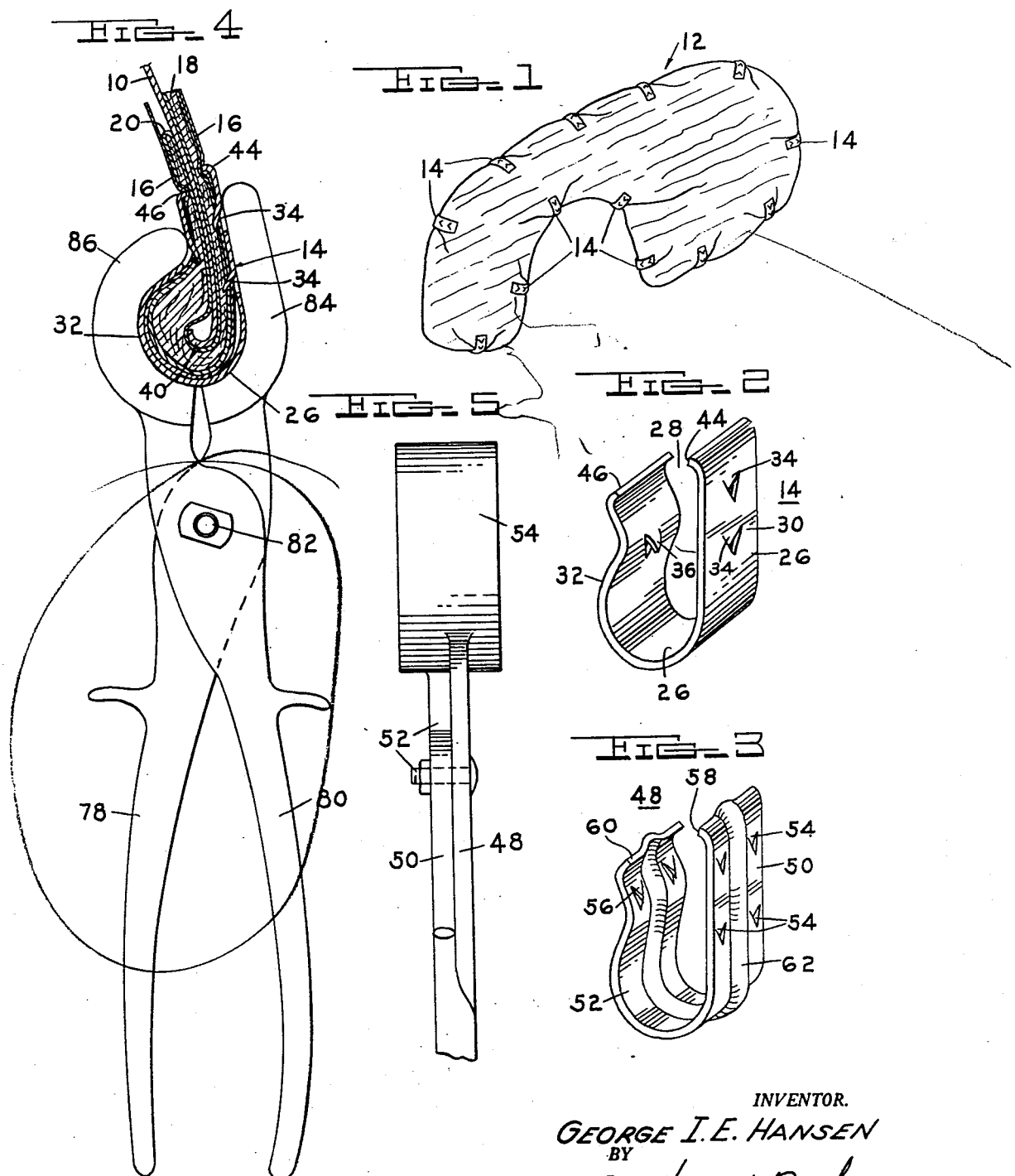

2,551,374

UNITED STATES PATENT OFFICE 2,551,374

COMBINATION PROTECTING SHIPPING PAD AND ATTACHING CLIP

George I. E. Hansen, Clawson, Mich., assignor to Cadillac Products, Inc., Ferndale, Mich., a corporation of Michigan Application October 11, 1948, Serial No. 53,968

6 Claims. (Cl. 229—87)

This invention relates to the protection of articles in shipment and in storage and particularly to means for removably attaching protective covering material to such articles.

Heretofore, it has been the general practice to provide relatively rigid enclosures for protecting articles in shipment and in storage, particularly finished articles whose surfaces are relatively easily damaged by contact with foreign bodies. Flexible protecting pads of paper have been suggested for such use and secured to the articles by ropes or cords. Finished articles having irregular formations or compound curves, such as fenders of automobiles and other parts thereof, have been especially difficult to protect for shipment and storage. When either a rigid enclosure or a rope secured flexible covering was employed, the resulting package was bulky and occupied considerable space rendering the shipping and storage costs relatively high.

An important object of the present invention is to improve the manner of attaching protecting covering materials to articles particularly of irregular shape which is inexpensive, is easily applied and removed from the article, and reduces the bulk of the package for economical shipment and storage. Another important object of the invention is to provide a flexible padded covering material for irregular shaped articles such as fenders and other parts of motor vehicles, which conforms to the shape of the articles and is secured thereto by edge engaging removable clips of novel design and function. A further important object of the invention is to provide an improved metal clip for securing protective covering material to articles intended for shipment or storage, which clip is so designed that it may be quickly attached and removed from the article without danger of marring or disfiguring the article.

In carrying out the invention, an article such as an automobile fender is covered by a flexible padded material which overlies the finished surfaces of the article and is folded around the edges of the article. A plurality of clips of the present invention are employed to secure the margins of the protecting covering to the edges of the article. Each clip is of generally U-shaped formation, being provided with means for penetrating the covering material to hold the clip and covering material on the article and further provided with means for limiting such penetration to less than the thickness of the covering material in order to prevent damage to the article. Preferably, the clips are applied to the covered article by a novel magnetic tool similar to a pair of pliers which is especially designed to apply the desired pressure to the clip to secure same in place. As a result of this invention, irregularly shaped articles such as automobile fenders, may be quickly covered with flexible padded material conforming to the shape thereof and nested together in order to reduce space for economical shipment and storage.

Various other objects, advantages and meritorious features of the invention will become more fully apparent from the following specification, appended claims and accompanying drawings wherein:

Fig. 1 is a perspective view of an article, such as an automobile fender, having a protecting covering material attached thereto in accordance with this invention, Figs. 2 and 3 are perspective views showing two modifications of a clip embodying the features of this invention, Fig. 4 is a view, partly in section and partly in elevation, showing a tool in the act of applying a clip of the present invention to the edge of a protectingly covered article, Fig. 5 is a side view of the operating head of the tool, taken 90° to the position of the tool in Fig. 4, Fig. 6 is a transverse sectional view through an automobile fender showing a protecting padded cover secured thereto by clips of the character shown in Fig. 2, Fig. 7 is a longitudinal sectional view through the attaching clip of Fig. 2, Fig. 8 is a side view of a plurality of protected automobile fenders arranged in a stack and showing the resulting bulk when the protecting covered material is secured to each fender by ropes or cords, Fig. 9 is a side view similar to Fig. 8 showing a plurality of automobile fenders nested together as a result of employing the clips of the present invention for securing the protective covering material in place, and Fig. 10 is a perspective view of a modified form of clip embodying the features of the invention.

Referring particularly to the drawings, Fig. 1, illustrates in general the application of the invention to an irregularly shaped article such as an automobile fender. Fig. 1 is a perspective view of automobile fender having the finished surfaces thereof protectingly covered with flexible material such as a composite cushioning body of crepe paper and excelsior. The protecting cover extends around the edges of the fender on all sides thereof and has its marginal portions secured to the edges of the fender by a plurality of novel removable clips. As shown in the cross sectional view in Fig. 6 the fender or other article intended for shipment or storage is indicated at 10. The protecting body of flexible material is generally indicated at 12 in Figs. 1 and 6, and the clips at 14.

The protecting body or pad 12 for the article preferably comprises an outer layer 16 of flexible sheet material, such as crepe paper, and a cushioning medium comprising excelsior 18 or the like. The latter is preferably completely enclosed and sealed in one or more flat sleeves or tubes 20 of paper thinner than the outer sheet 16. For the material of the excelsior containing sleeves or tubes it is preferred to use kraft paper. Although the thickness of the crepe and kraft papers may vary depending on the character of the article protected thereby, one desirable form of such protecting cover employs an outer sheet 16 of 60 lb. by weight paper being creped 25% to 30% and tubes 20 of 30 lb. by weight kraft paper. The quantity of excelsior 18 used fills out the sleeves or tubes 20 and is of a thickness greater than the combined thicknesses of the walls of the tubes and the outer sheet 16. The excelsior containing sleeves form a cushion between the outer layer 16 and the finished surface of the article and because of the nature of the excelsior filler it may be readily bent or folded with the paper sheets 16 and 20 to conform to the shape of the article protected thereby. Usually, as shown in Fig. 6, a plurality of flat sleeves of excelsior are associated with a single outer sheet 16 and prior to assembly on the articles are secured to the inner face of the sheet by adhesive material. By such securement the sleeves or tubes 20 and the outer base sheet 16 form a unitary assembly capable of being handled and turned at any desired angle without separation as they are applied to the article.

Initially it is preferred to make the covering material 12 oversize the article to be protected thereby and at least sufficient to overlie any finished surface of the article and have the marginal portions folded around the edges of the article. In the case of automobile fenders, as illustrated herein, the cover 12 is of a size to extend over the outside finished surface thereof and provide marginal portions which are foldable around the edges of the fender on all sides thereof. When applied to the fender, the excelsior containing side of the cover is brought up against the finished surface of the fender as shown in Fig. 6 in such a manner that the excelsior filled sleeves as well as the outer sheet 16 project beyond all side edges of the sheet preparatory to being folded thereabout. In securing the covering material to the fender or other article the outer creped sheet, by virtue of its elasticity, is capable of being stretched, if necessary, to accommodate itself to the formation of the article. In use, the outer layer of crepe paper has been found to be relatively tear resistant and because of its elasticity will give or stretch rather than immovably resist any rubbing contact of a foreign body. By so yielding or giving way to such contact, it preserves itself intact and considerably reduces the possibility of being punctured as would be the case if it did not have this stretching character.

Originally, it was suggested that the protecting covering material be secured to the article by strings or ropes. In the case of curved articles, such as automobile fenders and the like, the result of such securement is shown in Fig. 8 wherein longitudinal ropes 22 and transverse ropes 24 are wrapped around the covered article securing the protecting material over the finished surface of the article. The marginal portions of the covering material in such form of securement merely extended loosely around the edges of the article. The longitudinal securing ropes 22 project in spaced relation to the concave underside of the article as shown in Fig. 8 and prevented satisfactory stacking of the articles for shipment and storage. The resulting assembly was comparatively bulky and occupied considerable space. By utilizing clips 14 of the present invention the marginal portions of the protective covering material are folded completely around the edges of the article and by virtue of the fact that no longitudinal strings or ropes are necessary a plurality of such covered articles, as the automobile fenders heretofore mentioned, can be nested in a compact assembly as shown in Fig. 9. The result is a considerable reduction in the space occupied by such curved articles enabling more of the articles to be shipped and stored in the same space occupied by the rope method of securement illustrated in Fig. 8.

A clip constructed in accordance with the present invention is illustrated in enlarged scale in Figs. 2 and 7. Each clip 14 is formed of a metallic strip or band of bendable material and shaped into a generally U-shaped formation closed at one end 26 and opened at the opposite end as indicated at 28. The two legs of the clip, indicated at 30 and 32, are provided with novel means for engaging the protective covering material and securing the same to the marginal portions of the article.

As shown in Figs. 2 and 7, each leg 30 and 32 of the clip is provided with at least one inwardly projecting tang or prong. Two tangs or prongs are carried by the leg 30 as indicated at 34. A single tang or prong on the leg 32 is indicated at 36. The tangs are preferably formed by striking or punching the same out of the metal strip of the clip and as shown are preferably of triangular formation having their respective bases integrally joined to the strip. The tangs are located adjacent to but short of the extremities of the legs 30 and 32 and are formed so as to project inwardly of the clip.

The tangs or prongs 34 and 36 are further shaped at the time of their manufacture to extend at an inclination to the surface from which they project and toward the closed end 28 of the clip. In this manner the clip may be straddlingly slid upon the covered article and upon the opposite sides of the edges thereof without penetrating the protective material. Normally, the legs 30 and 32 are spaced apart from one another wider than the protected edges of the article in order that they may be slipped thereover without difficulty. As the clips are slipped over the covered edges of the article they fold the marginal portions of the covering material around the edges of the article. Thereafter the legs of the clip are bent toward one another by a tool such as that illustrated in Figs. 4 and 5 and in the act of so doing the tangs or prongs pierce the protective cushioning material interlocking the clip with the material and compactly holding the material to the edges of the article.

In addition to inclining the prongs toward the closed end of the clip in order to facilitate attachment of the clip, the apex end or tip of each prong is preferably slightly rolled away from the open end of the clip as shown in Figs. 2 and 7. This construction enables the clip to be slipped on the covered edge of an article without causing the prongs to catch on and tear the protective covering material.

One leg of each clip, such as leg 30, is preferably formed relatively straight. The opposite leg 32 is preferably bowed outwardly at 38 adjacent to the closed end 26 of the clip in order to pass around any flange on the article, such as the rolled over flange 40 on the outside marginal portion of the fender 10, illustrated in Figs. 4 and 6. As is customary, the inside marginal portion of an automobile fender is provided with a relatively flat flange 42 which is utilized to secure the fender to the body of a vehicle. Flange 42 is longer than flange 40 and the clips of the invention are of such a size as to conveniently straddle the flange as shown in Fig. 6 without directly overlapping upon the main body portion of the fender. Although one leg of each clip illustrated herein is outwardly bowed, the clip is capable of use on flat edges, as shown by the clip on flange 42 in the upper end of Fig. 6, as well as use on rolled over or beaded edges, as shown by the clip on flange 40 at the lower end of Fig. 6.

Each clip is constructed in a novel manner to limit the extent the prongs or tangs 34 and 36 penetrate the protective covering material in order to prevent direct contact of the prongs with the surfaces of the article. For this purpose, the outer extremity of each leg of the clip in Figs. 2 and 7 is bent inwardly to provide a flange which is shaped to compress the covering material without penetrating the same. As shown in the detail views of Figs. 2 and 7, the outer end of the leg 30 is inwardly bent to form such a flange 44. Similarly, the other leg 32 is bent at its outer extremity to form a flange 46. As shown in Fig. 7, the prongs 34 and 36 project inwardly beyond the inner edges of the flanges. The extent of the projection of the prongs beyond the flanges is less than the thickness of the protective material. As shown in Figs. 2 and 7, the edges of the flanges 44 and 46 are flat or blunt and when engaged with the protective material and pressed thereagainst they do not penetrate the material but merely compress it as shown in Fig. 4 and in the assembly view of Fig. 6. The limited projection of the prongs as privided by the flanges prevents their contact with the surfaces of the article, particularly the finished surfaces thereof in order to prevent damage or marring as would otherwise occur.

Fig. 3 illustrates a modified form of the clip embodying the features of the invention. It is generally indicated at 48 and comprises a straight leg portion 50 and an outwardly bowed leg portion 52 and is closed at one end and opened at the other end similar to the clip previously described. The leg 50 is provided with four prongs or tangs 54 struck out of the metal of the leg and projecting inwardly thereof. Tangs 54 are located on opposite sides of the center line of the leg and disposed in two spaced apart rows as shown in Fig. 3. The leg 52 is provided with two tangs or prongs 56 struck out of the metal of the leg and projecting inwardly thereof. These tangs are arranged on opposite sides of the center of the leg. The open ends of the legs are each curved inwardly as shown at 58 and 60 in the form of inwardly bent flanges similar to the flanges 44 and 46 previously described in connection with the clip in Fig. 2. The inward projection of the flanges 58 and 60 is less than that of the tangs but sufficient to prevent the tangs from passing completely through the protective material and contacting the surfaces of the article protected thereby.

For reinforcement purposes, the clip of Fig. 3 is shaped under dies to provide an outwardly projecting ridge 62 extending on the longitudinal median line of the clip from one open end to the other open end thereof as shown in Fig. 3. The reinforcing ridge forms an inwardly opening channel in the two legs 50 and 52 and in the closed end of the clip. The prongs 54 and 56 are located on opposite sides of the reinforcing ridge.

Fig. 10 illustrates another modified form of clip generally indicated at 64 and embodying the features of the invention. The clip 64 is generally similar to the two clips previously described and comprises the relatively straight leg portion 66 and the opposite outwardly bowed leg portion 68. The straight leg portion 66 is provided with a plurality of inwardly projecting tangs or prongs 70 which are struck out of the metal of the leg adjacent to the open end of the clip. In this modification, four such prongs are provided arranged in two spaced rows similar to the clip of Fig. 3. The leg 68 is provided with two inwardly projecting prongs 72 struck out of the metal of the leg and arranged side by side adjacent to the open end thereof. Each leg is provided with an inwardly projecting side marginal flange which as shown in Fig. 10 also extends along the margins of the closed end of the clip. These flanges are formed integrally with the metal of the clip and are bent into their shape at the time the clips are formed under dies. One of the flanges for the leg 68 is shown at 74 and it is understood that the opposite side margin of the leg is similarly provided with a corresponding flange. The leg 70 is also provided with two inwardly projecting marginal flanges 76—76. The flanges 74 and 76 of this embodiment of the invention not only reinforce the clip but also serve in the same capacity as the flanges 44, 46, 58 and 60 previously described to limit the penetration of the prongs into the protective covering material.

The flanges project inwardly a distance less than the prongs 70 and 72 but sufficient to prevent the prongs from penetrating completely through the covering material over which the clip is placed thereby avoiding any contact of the prongs with the finished surfaces of the metal.

Although the clips can be attached by hand and thereafter clenched to the covered article by means of any suitable tool, it is preferred to use the tool illustrated in Figs. 4 and 5 for this purpose. The tool illustrated therein is substantially like a pair of pliers and comprises two arms 78 and 80 pivoted together intermediate their ends at 82 and provided at their working ends with a pair of jaws 84 and 86. The handle portions of the tool are grasped by the workman and when compressed cause the jaws to approach one another. One jaw, such as 86, is formed with an outward curvature in order to conform with the outwardly bowed leg of the clips. Each clip before attachment to the covered article is inserted between the jaws and retained therein under slight pressure if desired. However, it is preferred to make the jaws 84 and 86 of permanently magnetized material such that the clip will be magnetically held therewithin and prevented by magnetic attraction from accidentally falling out of the tool.

What I claim is:

1. An attaching clip for securing a yieldable protective covering material to a finished article comprising a flat metal strip bendable under pressure and formed into a general U-shaped formation, one leg of the U-shaped formation of the clip being relatively straight and the other leg being convexly curved adjacent to the closed end of the clip so as to dispose this section of the leg a greater distance from the relatively straight leg than the outer end sections thereof, the outer ends of the legs of the clip remote from the closed end thereof being inwardly turned to form blunt edged flanges adapted to abut and compress the protective covering material enclosed by the clip, and inwardly projecting prongs struck out of the material of the clip beyond the convex section of the curved leg and adjacent to the flanged ends thereof and inclined toward the closed end of the U-shaped formation to facilitate attachment of the clip over the covering material of the article, said prongs projecting inwardly a distance greater than the flanged ends of the clip for penetration of the covering material.

2. In combination with an article having an edge around which a yieldable padded covering is placed, a generally U-shaped clip of bendable metallic material embracing the edge of the article and having the legs thereof compressively engaging the padded covering thereof, the outer ends of the legs of the clip being inwardly turned to form flanges which compressibly abut the protective covering, and inwardly extending prongs carried by the legs of the U-shaped clip inclining toward the closed end thereof, said prongs projecting beyond said flanges but less than the thickness of the padded covering and penetrating the latter to prevent withdrawal of the clip from the edge of the article.

3. In combination with a finished metallic sheet over which a padded protective covering material is placed with the margins thereof folded about the opposite edges of the sheet, a plurality of U-shaped clips straddling the opposite edges of the sheet and each having the legs thereof compressibly bearing upon the padded protective covering material, the outer ends of the legs being provided with inwardly turned flanges extending the width of the clip and compressibly abutting the padded material of the covering, and said legs of the clips being further provided with inwardly bent prongs struck out of the material of the clip and inclined toward the closed end thereof, said prongs projecting beyond the flanged ends of the clip but less than the thickness of the padded covering material and penetrating the latter to prevent withdrawal of the clip from the sheet.

4. An attaching clip for securing yieldable protective covering material to a finished article, comprising a flat metal strip formed into a generally U-shaped formation and contractually deformable under pressure, one leg of the U-shaped formation of the clip being relatively straight, the other leg of the U-shaped formation of the clip having the section adjacent to the closed end of the clip convexly curved so as to dispose this section of the leg a greater distance from the relatively straight leg than the distance separating the outer end sections of both legs, inwardly projecting tangs struck out from the material of the legs beyond the convex section of the curved leg and adjacent to the outer ends thereof, said tangs inclining toward the closed end of the clip to facilitate the attachment of the clip over the covering material of the article and each terminating in a point rounded in the direction of the closed end of the clip, and a blunt edged flange on the extremity of each of the legs of the clip extending inwardly toward the opposite leg and adapted to abut and compress the protective covering material enclosed by the clip, said tangs projecting inwardly beyond said flanges a distance less than the thickness of the covering material to prevent contact of the tangs with the article.

5. An attaching clip for securing a yieldable protective covering material to an article comprising a flat metal strip bent into a generally U-shaped formation and contractually deformable under pressure to bring the legs of the U-shaped formation into proximity with one another, one leg of the U-shaped formation of the clip having the section thereof adjacent to the closed end of the U convexly curved so as to dispose this section of the leg a greater distance from the relatively straight leg than the distance separating the outer end sections of both legs when the two legs are contracted into clamping engagement with an object therebetween, the outer end sections of each of the legs of the clips remote from the closed end thereof being provided with inwardly projecting tangs struck out from the material of the legs, said tangs inclining toward the closed end of the clip to facilitate attachment of the clip over the covering material of the article and each terminating in a relatively sharp point for penetration of the covering material, and a blunt edged flange associated with each leg and forming an integral part thereof, each of said flanges being located on the outer end section of the leg with which it is associated and extending inwardly toward the opposite leg, said flanges adapted to abut and compress the protective covering material enclosed by the clip, and said tangs projecting inwardly a distance greater than said flanges for penetration of the covering material compressed by the flanges.

6. In combination with a sheet metal article having a laterally projecting flanged edge along at least one side thereof, a padded protecting covering material extending over the finished surface of the sheet metal article and folded around said flanged edge thereof, a generally U-shaped clip of bendable metallic material straddling said flanged edge of the article and having the legs thereof bearing upon the padded protective material folded therearound, the outer ends of the legs of the clip being inwardly turned and provided with inwardly turned edges compressibly abutting the padded material of the covering on opposite sides of the sheet, the leg of the clip on the flanged edge side of the article being convexly curved adjacent to the closed end of the clip to clear the flange, and said legs of the clip beyond the convex portion of said last mentioned leg being provided with inwardly extending tangs struck out of the material of the clip and inclined toward the closed end thereof, said tangs projecting beyond the inwardly turned ends of the clip but less than the thickness of the padded material and penetrating the latter to prevent withdrawal of the clip from the protective covering material.

GEORGE I. E. HANSEN.

(References on following page)

REFERENCES CITED

The following references are of record in the file of this patent:

UNITED STATES PATENTS

| Number | Name | Date |
|---|---|---|
| 282,945 | Bacon | Aug. 14, 1883 |
| 819,064 | Hartshorn | May 1, 1906 |
| 903,173 | Cliff | Nov. 10, 1908 |
| 985,825 | McGill | Mar. 7, 1911 |
| 1,211,158 | Irwin | Jan. 2, 1917 |
| 1,271,607 | Oppenheim | July 9, 1918 |
| 1,372,205 | Smith | Mar. 22, 1921 |

FOREIGN PATENTS

| Number | Country | Date |
|---|---|---|
| 14,886 | Denmark | July 31, 1911 |
| 17,096 | Great Britain | of 1895 |
| 573,405 | France | Mar. 10, 1924 |
| 740,141 | France | Nov. 12, 1932 |